(12) United States Patent
Natanzon et al.

(10) Patent No.: US 10,235,064 B1
(45) Date of Patent: Mar. 19, 2019

(54) OPTIMIZED DATA REPLICATION USING SPECIAL NVME PROTOCOL AND RUNNING IN A FRIENDLY ZONE OF STORAGE ARRAY

(71) Applicant: EMC IP Holding Company LLC, Hopkinton, MA (US)

(72) Inventors: Assaf Natanzon, Tel Aviv (IL); Saar Cohen, Moshav Mishmeret (IL); Kirill Shoikhet, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/391,070

(22) Filed: Dec. 27, 2016

(51) Int. Cl.
*G06F 3/06* (2006.01)
(52) U.S. Cl.
CPC ............ *G06F 3/0619* (2013.01); *G06F 3/065* (2013.01); *G06F 3/0665* (2013.01); *G06F 3/0689* (2013.01)
(58) Field of Classification Search
CPC .... G06F 3/0689; G06F 3/0619; G06F 3/0665; G06F 3/065
USPC ........................................................ 711/114
See application file for complete search history.

(56) References Cited

U.S. PATENT DOCUMENTS

| | | | |
|---|---|---|---|
| 7,203,741 B2 | 4/2007 | Marco et al. | |
| 7,719,443 B1 | 5/2010 | Natanzon | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |
| 8,108,634 B1 | 1/2012 | Natanzon et al. | |
| 8,214,612 B1 | 7/2012 | Natanzon | |
| 8,250,149 B2 | 8/2012 | Marco et al. | |
| 8,271,441 B1 | 9/2012 | Natanzon et al. | |
| 8,271,447 B1 | 9/2012 | Natanzon et al. | |

(Continued)

OTHER PUBLICATIONS

EMC, "Introduction to the EMC XtremIO Storage Array (Version 4)"; EMC Corporation; Apr. 2015; 65 Pages.

*Primary Examiner* — Hua J Song
(74) *Attorney, Agent, or Firm* — Daly, Crowley Mofford & Durkee, LLP

(57) ABSTRACT

A storage system comprises a storage array in operable communication with and responsive to instructions from a host. The storage array comprises a logical unit (LU), a privileged zone, a data protection appliance (DPA), and an intermediary device. The privileged zone is configured within the storage array and permits at least one predetermined process to have access to the LU. The DPA is configured to operate within the privileged zone. The intermediary device is in operable communication with the host, LU, and DPA and is configured to receive read and write instructions from the DPA and to ensure that I/O's passing through the intermediary device to at least one of the LU and the DPA, in response to the reads and writes, are formatted to a first predetermined standard, for at least one of the LU and the DPA.

20 Claims, 8 Drawing Sheets

(56) References Cited

U.S. PATENT DOCUMENTS

| | | |
|---|---|---|
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,317,375 B1 * | 4/2016 | Sadhu ................ G06F 11/1451 |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,303 B1 * | 5/2017 | Huff ................ G06F 3/064 |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |

(56) References Cited

U.S. PATENT DOCUMENTS

| | | |
|---|---|---|
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |

\* cited by examiner

US 10,235,064 B1

OPTIMIZED DATA REPLICATION USING SPECIAL NVME PROTOCOL AND RUNNING IN A FRIENDLY ZONE OF STORAGE ARRAY

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This application relates at least to generally relate to devices, systems, and methods for data storage in computer systems. More particularly, this application relates at least to ways to improve efficiency of data replication and related operations.

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data. Conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

One example of a data protection system is a distributed storage system. A distributed storage system may include a plurality of storage devices (e.g., storage arrays) to provide data storage to a plurality of nodes. The plurality of storage devices and the plurality of nodes may be situated in the same physical location, or in one or more physically remote locations. A distributed storage system may include data protection systems that back up production site data by replicating production site data on a secondary backup storage system. The production site data may be replicated on a periodic basis and/or may be replicated as changes are made to the production site data. Some existing data protection systems may provide continuous data protection, meaning that every change made to data is backed up. Current data protection systems try to provide continuous data protection, which enable the organization to roll back to any specified point in time within a recent history. Continuous data protection typically uses a technology referred to as "journaling," whereby a log is kept of changes made to the backup storage. During a recovery, the journal entries serve as successive "undo" information, enabling rollback of the backup storage to previous points in time.

SUMMARY

This Summary is provided to introduce a selection of concepts in a simplified form, to provide a basic understanding of one or more embodiments that are further described below in the Detailed Description. This Summary is not intended to identify key features or essential features of the claimed subject matter, nor is it intended to be used to limit the scope of the claimed subject matter.

One aspect provides a storage system, comprising a storage array in operable communication with and responsive to instructions from a host. The storage array comprises a logical unit (LU), a privileged zone, a data protection appliance (DPA), and an intermediary device. The privileged zone is configured within the storage array and permits at least one predetermined process to have access to the LU. The DPA is configured to operate within the privileged zone. The intermediary device is in operable communication with the host, LU, and DPA and is configured to receive read and write instructions from the DPA and to ensure that I/O's passing through the intermediary device to at least one of the LU and the DPA, in response to the reads and writes, are formatted to a first predetermined standard, for at least one of the LU and the DPA.

Details relating to this and other embodiments are described more fully herein.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

Figure 1:
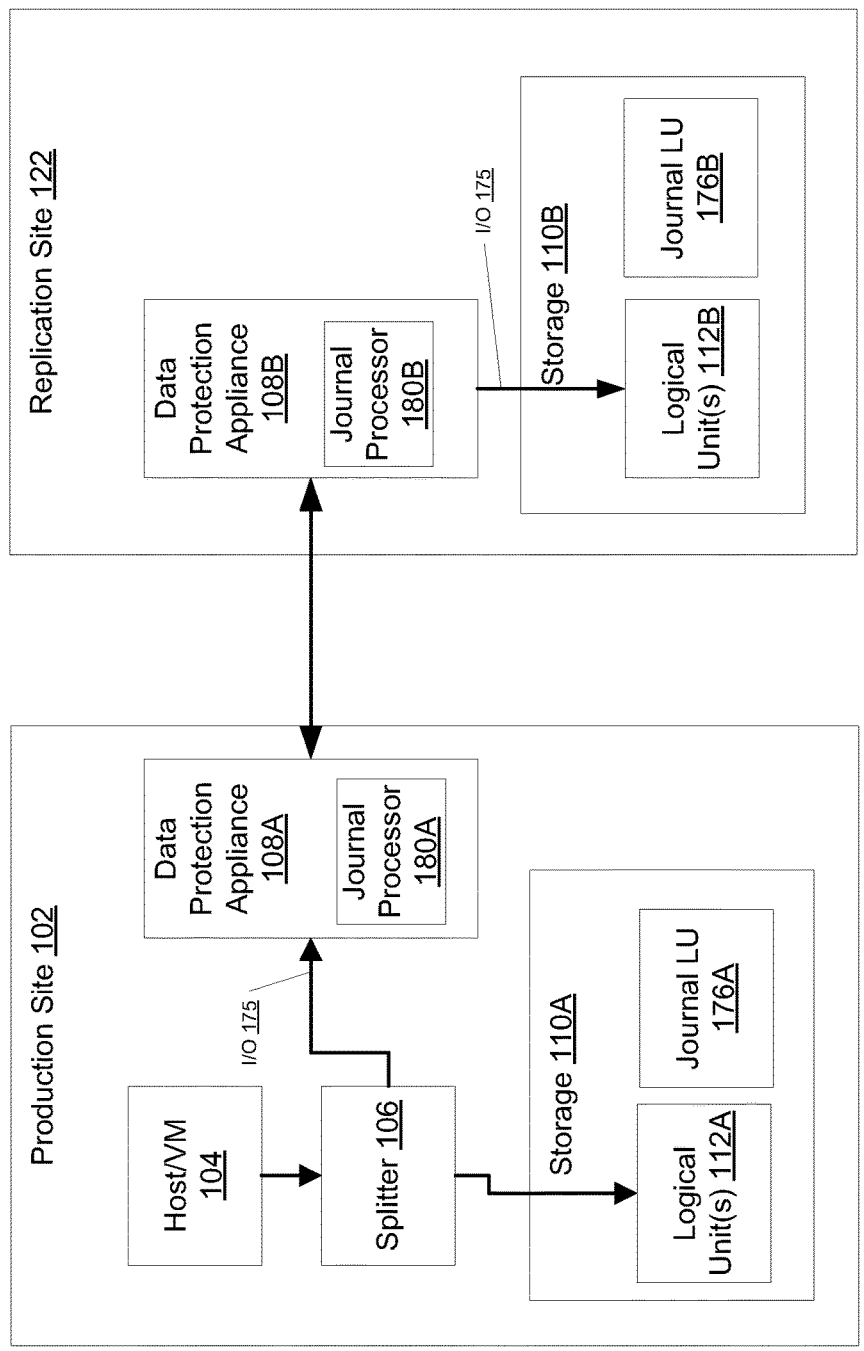
FIG. 1 is a first simplified block diagram of a data protection system, in accordance with at least one illustrative embodiment of the instant disclosure.
Figure 2:
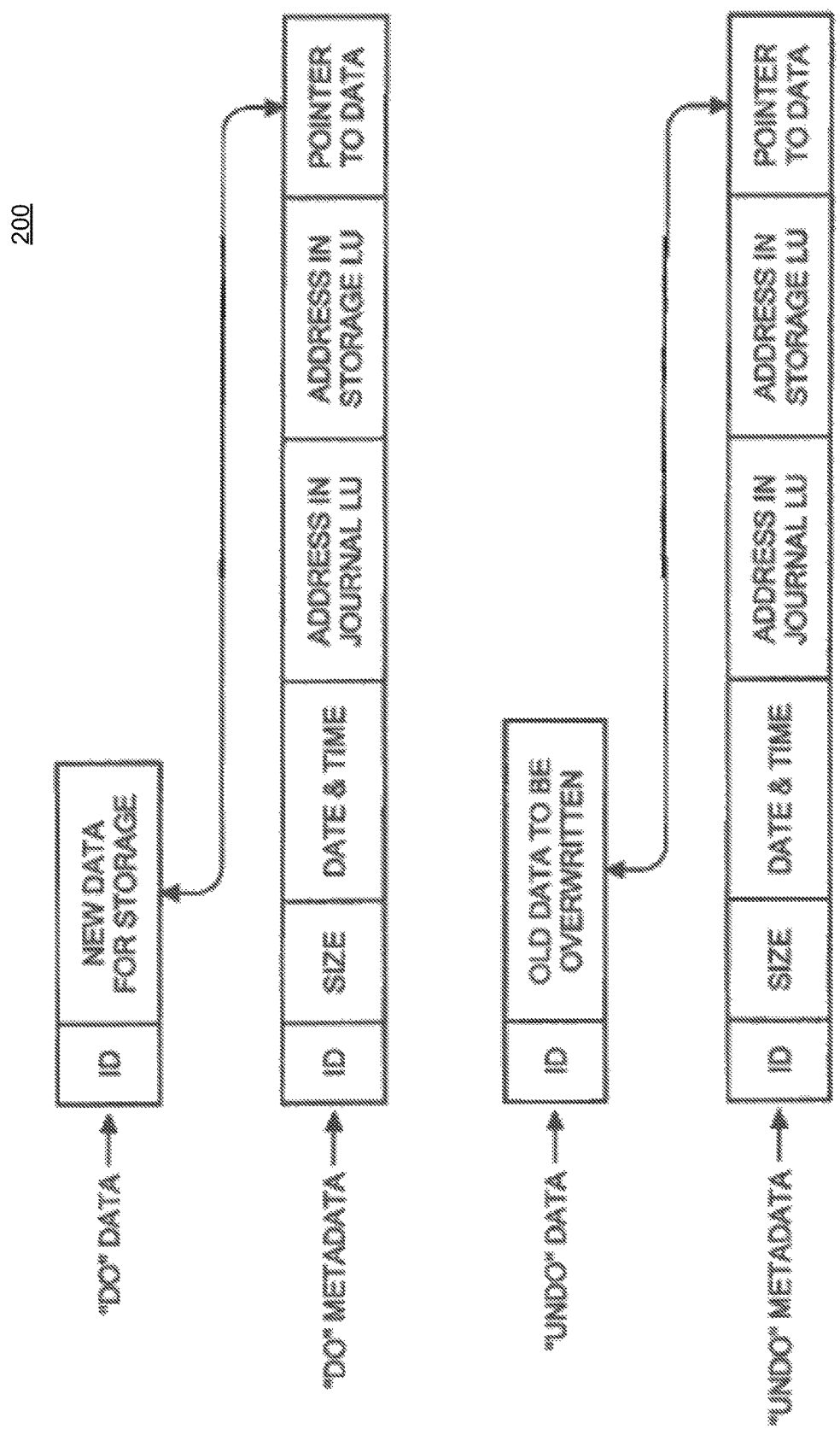
FIG. 2 is a diagram illustrating a journal history of write transactions for the data protection systems of FIGS. 1 and 3, in accordance with at least one illustrative embodiment of the instant disclosure.
Figure 3:
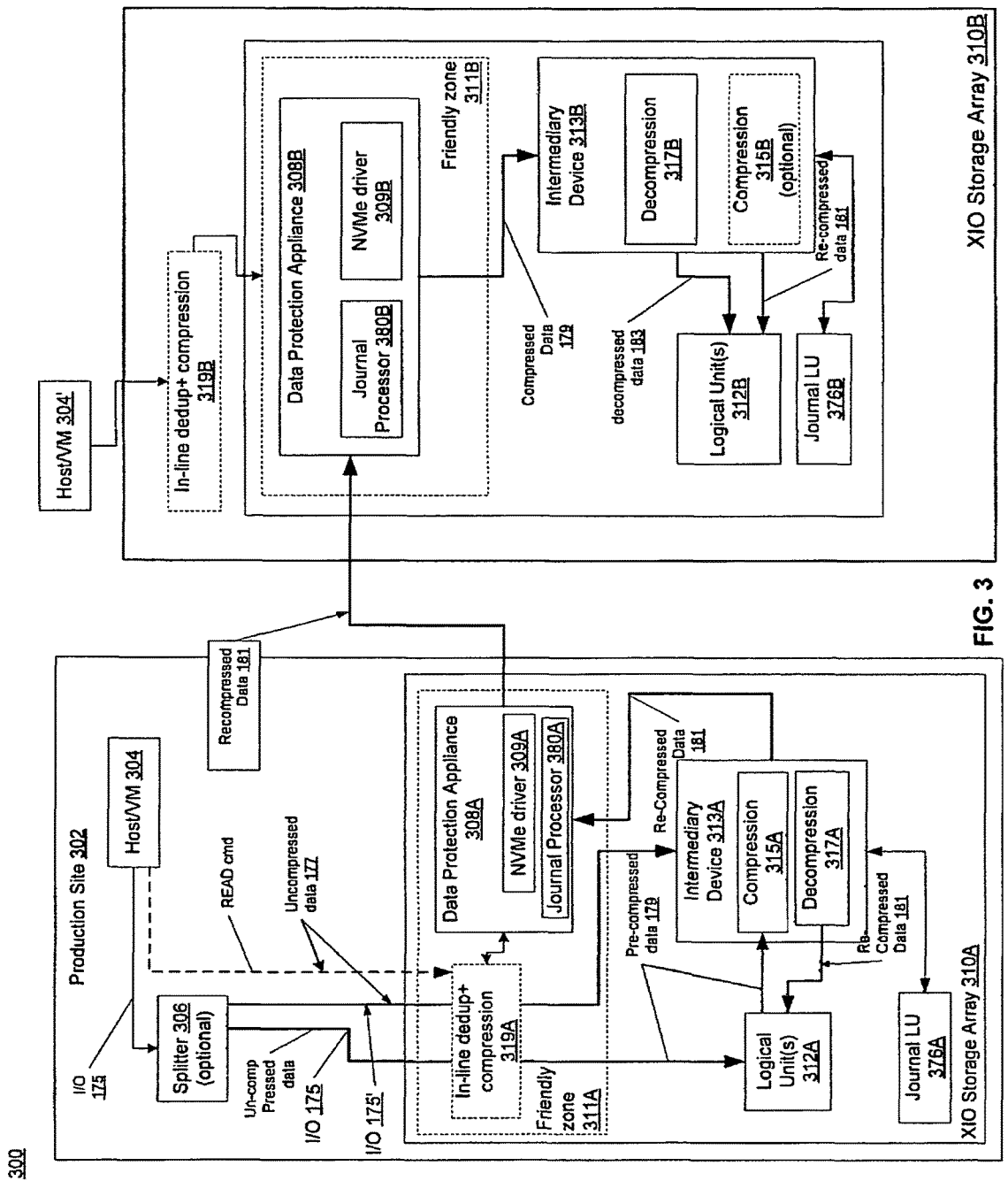
FIG. 3 is a second simplified block diagram of a data protection system, in accordance with at least one illustrative embodiment of the instant disclosure.
Figure 4:
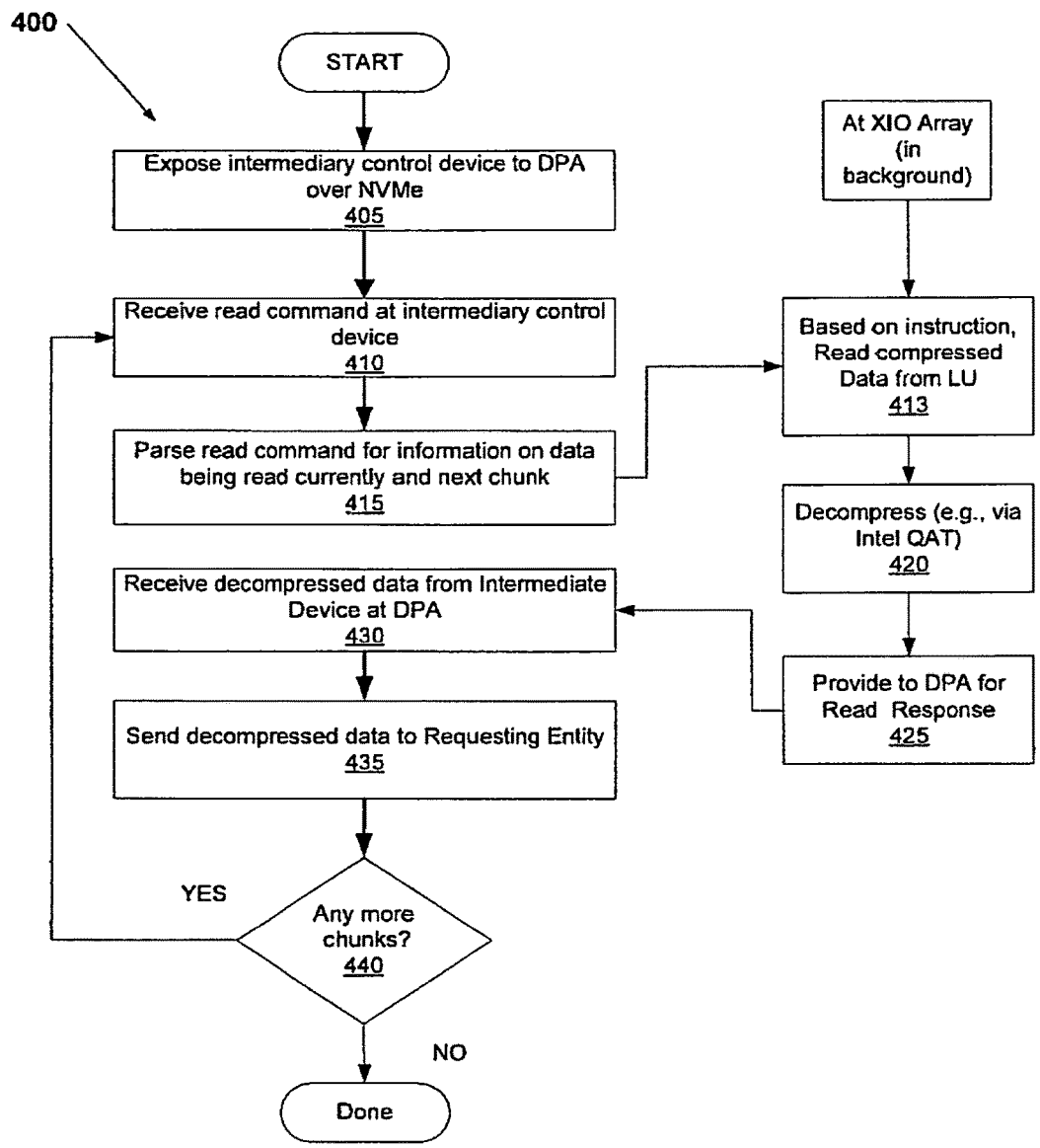
FIG. 4 is a simplified flowchart of actions occurring at a production side in the data protection system of FIG. 3, during a READ operation, in accordance with at least one illustrative embodiment of the instant disclosure.
Figure 5:
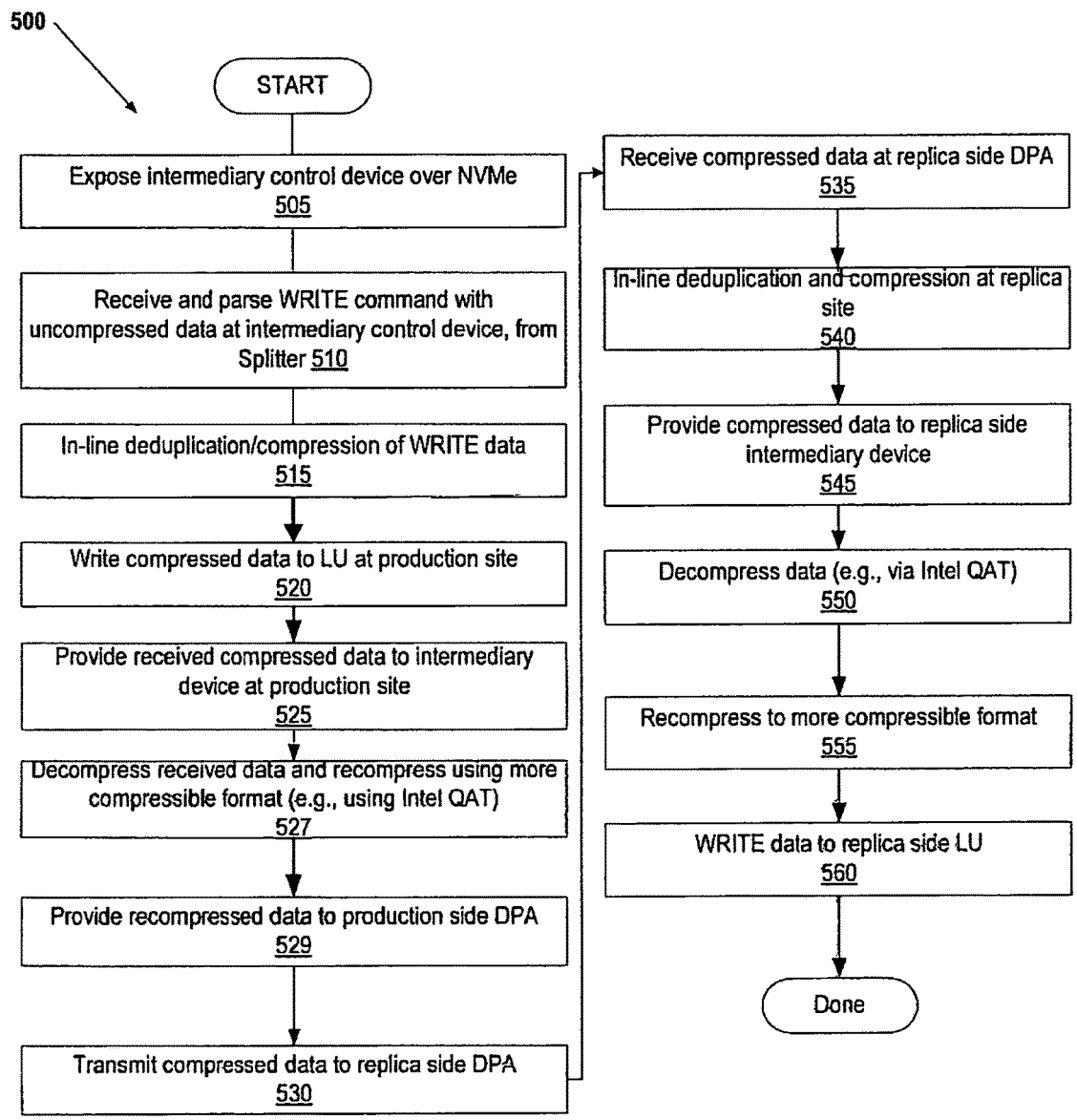
FIG. 5 is a simplified flowchart of actions occurring at a replication side in the data protection system of FIG. 3, during a WRITE operation, in accordance with at least one illustrative embodiment of the instant disclosure.
Figure 6:
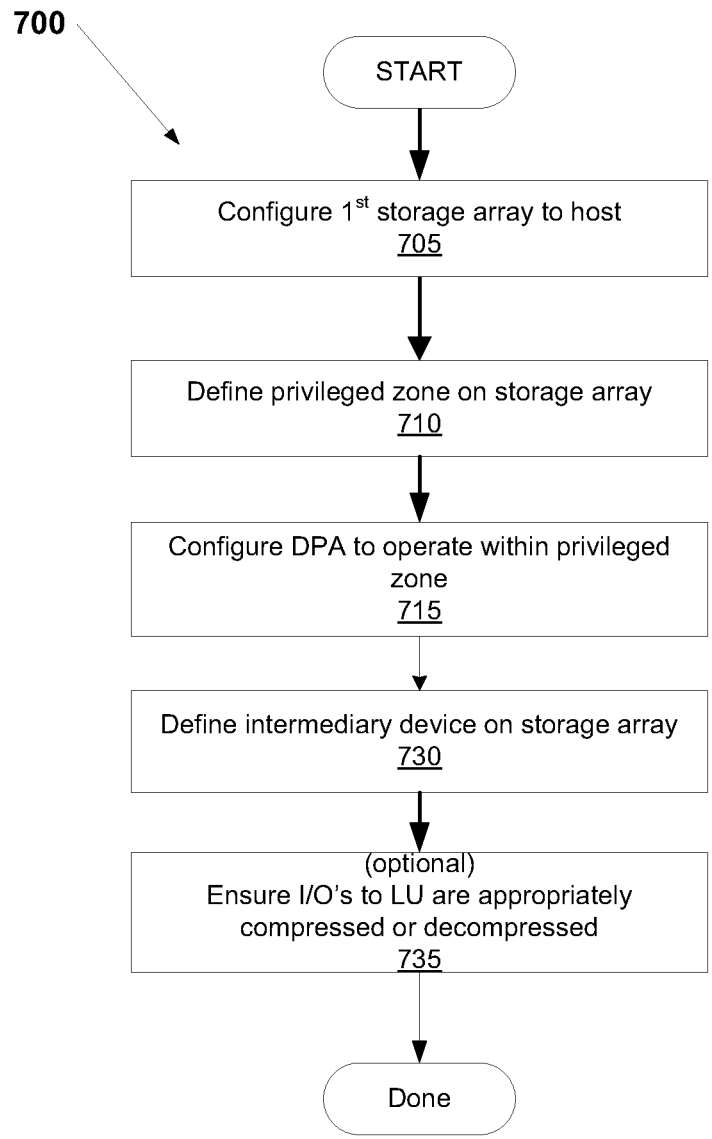
FIG. 6 is as simplified flowchart of as basic method of operation of the system of FIG. 3, in accordance with at least one illustrative embodiment.
Figure 7:
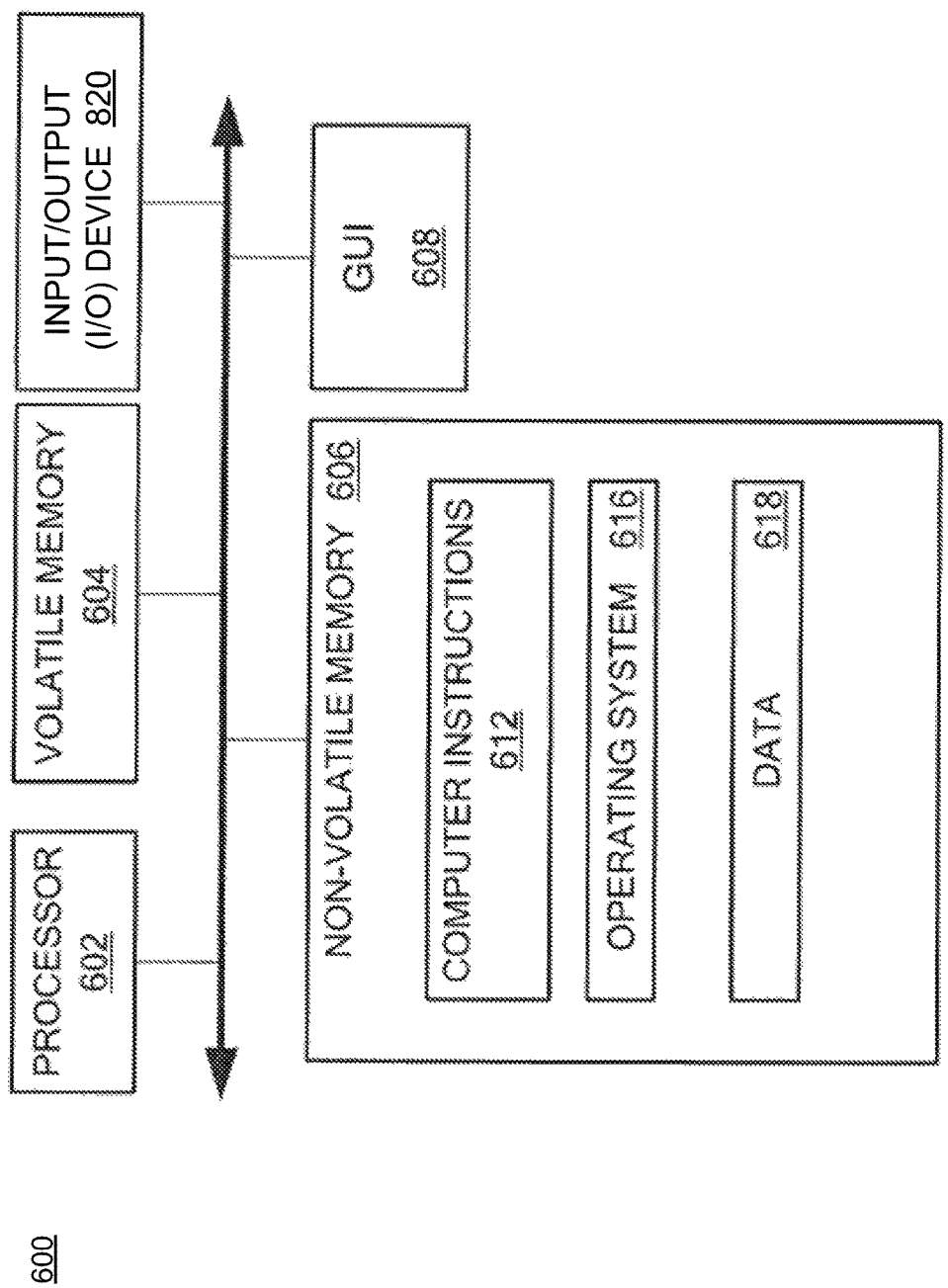
Figure 8:
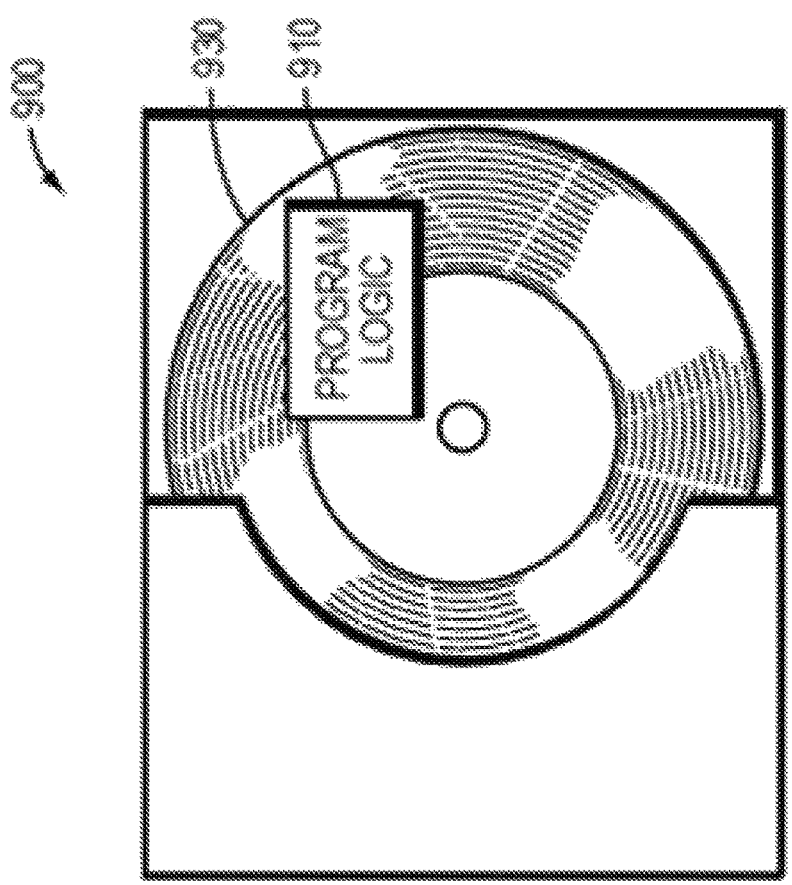

FIG. 7 is a simplified block diagram of an example of an apparatus that may be used to implement at least a portion of the systems of FIGS. 1-3 and at least a portion of the processes of FIGS. 4-5; and FIG. 8 is a simplified example of an embodiment of a method embodied on a computer readable storage medium that may utilize at least some of the techniques described herein, including at least those described in FIGS. 1-6, in accordance with at least one embodiment of the present disclosure.

DETAILED DESCRIPTION

Before describing embodiments of the concepts, structures, and techniques sought to be protected herein, some terms are explained. In particular, the following may be helpful in understanding the specification and claims:

In certain embodiments, the term "I/O request" or simply "I/O" may be used to refer to an input or output request, such as a data read or data write request. In certain embodiments, a SAN may be a storage area network of nodes (also called devices) that send and receive I/O and other requests, each node in the network being an initiator or a target, or both an initiator and a target. In certain embodiments, an initiator may be a node in a SAN that issues I/O requests. In certain embodiments, a target may be a node in a SAN that replies to I/O requests. In certain embodiments, a node can provide at least a processor function. In certain embodiments, a node can include both a processor function and a memory function.

In certain embodiments, a host may be at least one computer or networks of computers that runs at least one data processing application that issues I/O requests to one or more storage systems and that can communicate with its corresponding storage system using small computer system interface (SCSI) commands. In some embodiments, a host is an initiator with a SAN, and a host may be a virtual machine. In certain embodiments, a host device may be an internal interface in a host, to a logical storage unit. In certain embodiments, a production site may be a facility where one or more host computers run data processing applications that write data to a storage system and read data from the storage system; may be a virtual or physical site. In certain embodiments, a backup site may be a facility where replicated production site data is stored; the backup site may be located in a remote site or at the same location as the production site; a backup site may be a virtual or physical site. In certain embodiments, a back-up site may be an object store.

In certain embodiments, an object may represent a logical construct containing data. In some embodiments herein, an object containing metadata may be referred to as a metadata object. In certain embodiments, as used herein, a change object may refer to an object with accumulated I/O. In certain embodiments, an object store (also referred to as object storage) may be a storage architecture that manages data as objects, in contrast to file systems which manage data as a file hierarchy and block storage which manages data as blocks within sectors and tracks. Each object includes the data itself, a variable amount of metadata, and a globally unique identifier, where the object store can be implemented at multiple levels, including the device level (object storage device), the system level, and the interface level. In certain embodiments, a cloud may provide an object store. For example, in at least some embodiments, a cloud is an off-premise form of computing that stores data on the Internet.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN)). In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium. In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a storage system may be a SAN entity that provides multiple logical units for access by multiple SAN initiators, and in some embodiments, the term "storage system" may encompass physical computing systems, cloud or virtual computing systems, or a combination thereof. In certain embodiments, a WAN may be a wide area network that connects local networks and enables them to communicate with one another, such as the Internet. In certain embodiments, a virtual volume may be a volume which is exposed to host by a virtualization layer; the virtual volume may be spanned across more than one site and or volumes. In certain embodiments, a volume may be an identifiable unit of data storage, either physical or virtual; that is, a volume can be a removable hard disk, but is not limited as being a unit that can be physically removed from a computer or storage system.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines. In certain embodiments, a physical storage unit may be a physical entity, such as a disk or an array of disks, for storing data in storage locations that can be accessed by address, where physical storage unit is used interchangeably with physical volume.

In certain embodiments, a DPA may be Data Protection Appliance a computer or a cluster of computers, or a set of processes that serve as a data protection appliance, responsible for data protection services including inter alia data replication of a storage system, and journaling of I/O requests issued by a host computer to the storage system. The DPA may be a physical device, a virtual device running, or may be a combination of a virtual and physical device. In most embodiments, a DPA may accumulate I/O and package it into an object. In many embodiments, a DPA may accumulate I/O until a certain or predetermined size, such as one megabyte, is reached. In most embodiments, a DPA may send a data object representing I/O to a cloud. In certain embodiments, an RPA may be replication protection appliance, which may be used interchangeable with and is another name for DPA. In certain embodiments, RPA instead may refer to RecoverPoint Appliance, which can be configured to manage replication set and operations, compressing data with advanced algorithms for efficient bandwidth utilization. In certain embodiments, an RPA may be a virtual DPA or a physical DPA. For example, in some embodiments, the RPA is a virtual DPA since it does not have its own physical hardware and is hosted within the array itself in its "friendly zone" (as explained further herein). In certain embodiments, a DPA may track metadata about changes corresponding to I/O in an object.

In certain embodiments, a splitter (also referred to as a protection agent) may be an agent running either on a production host a switch or a storage array, or in a network, or at a hypervisor level. A splitter, in certain embodiments, can intercept I/O's and split them to a DPA and to the storage array, fail I/O's, redirect I/O's or do any other manipulation to the I/O's. The splitter or protection agent may be used in both physical and virtual systems. The splitter may be in the I/O stack of a system and may be located in the hypervisor for virtual machines. In some embodiments, I/O sent to a LUN or LU on a production site may be intercepted by a splitter. In many embodiments, a splitter may send a copy of I/O sent to LUN or LU to a data protection appliance or data protection application (DPA). In some embodiments, splitters can be array-based, fabric-based, or host based. In certain embodiments, In at least some embodiments, a copy of a LUN or LU may be made, and such copy may include a set of objects, which may represent data on the LUN. In some embodiments, a copy of a LUN may include one or more metadata objects, which may describe how a set of objects representing data of the LUN correspond to or may be used to create the LUN. In at least some embodiments, a copy of a LUN or LU has a set of metadata objects and a set of objects may be sent to a cloud. In certain embodiments, a copy of a LUN or LU as a set of metadata objects and a set of objects may be sent to an object store. In certain embodiments, CRR (continuous remote replication) a may refer to a full replica of a volume or a set of volumes along with a journal which allows any point in time access at a site remote to the production volume and on a separate storage array.

In certain embodiments, a source side may be a transmitter of data within a data replication workflow, during normal operation a production site is the source side; and during data recovery a backup site is the source side; may be a virtual or physical site. In certain embodiments, a target side may be a receiver of data within a data replication workflow. During normal operation a back site is the target side, and during data recovery a production site is the target side. A target site may be a virtual or physical site, and a target site may be referred to herein as a replication site.

In certain embodiments, an image may be a copy of a logical storage unit at a specific point in time. In certain embodiments, a clone may be a copy or clone of the image or images, and/or drive or drives of a first location at a second location. In some embodiments, a clone may be made up of a set of objects. In certain embodiments, a snapshot may refer to differential representations of an image, i.e. the snapshot may have pointers to the original volume, and may point to log volumes for changed locations. Snapshots may be combined into a snapshot array, which may represent different images over a time period. In some embodiments, a snapshot can include a full volume copy, also known as a mirror, clone, or business continuance volume as well as a partial copy, where only changed data, or pointers to changed data, is kept.

At least some disclosed embodiments may enable replication to a cloud. At least some embodiments may enable to replication to an object store. At least some embodiments may enable replication to a cloud with an object store. In some embodiments, replication to an object store may include sending objects representing changes to one or more LUNS on a production site to an object store. In many embodiments, an object store may have a copy of a LUN as a set of objects and a set of metadata objects. In these embodiments, as I/O occurs to the LUN, the object store may receive a set of change objects corresponding to the changes written to the LUN. In these embodiments, the object store may receive a set of metadata objects describing the changes to the LUN in the objects. In most of these embodiments, the set of change objects and the set metadata objects may be used as a journal. In most of these embodiments, using the set of metadata objects, one or more portions of the or more of the change objects may be applied to the create new objects to replace the set of objects and the set of metadata objects corresponding to the copy of the LUN. In most of these embodiments, by replacing objects and metadata objects corresponding to the LUN, it may move the copy of the LUN to a future point in time. In some of these embodiments, by keeping the original set of metadata objects and objects, it may be possible to access the original LUN as well as any point in time. In most of these embodiments, by reading the metadata objects describing the set of change objects, multiple points of time may be created on the cloud site. In further embodiments, metadata objects may be created that correspond to information about how to move a new point in time back to a previous point in time.

In certain embodiments, a journal may be a record of write transactions (e.g., I/O data) issued to a storage system, which may be used to maintain a duplicate storage system, and to roll back the duplicate storage system to a previous point in time. In some embodiments, the journal includes a redo log that includes changes that occurred to a production volume and not yet applied to the replica/duplicate, and an undo log having a list of changes that undo the latest changes in the replica/duplicate volume. In some embodiments, each entry in a journal contains, apart from the I/O data itself, I/O metadata that can include information such as a volume identifier (ID), the I/O block offset within the volume, the I/O length, and a time stamp of the I/O.

In certain embodiments, virtual access may be an access method provided by the appliance and the splitter, in which the appliance exposes a virtual volume from a specific point in time to the host, the data for the virtual volume is partially stored on the remote copy and partially stored on the journal.

In many embodiments, a set of virtual machines may be used in the cloud or in the object store. In certain embodiments, a set of virtual machines in a cloud may process metadata objects describing the set of change objects to create a new point in time for a LUN. In many of these certain embodiments, the set of virtual machines may read a set of metadata objects corresponding to the set of change objects to create new objects to replace a set of original objects corresponding to a LUN. In further embodiments, a set of virtual machines may run periodically and/or on demand to create new points in time for an object store or cloud containing changes to a copy of a LUN.

In certain embodiments, XtremIO (hereinafter "XIO") (available from EMC/Dell of Hopkinton, Mass.) is a type of storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data. XIO has a built in capability to automatically reduce (e.g., via deduplication and compression) data as it enters the system in which it is implemented, processing it in data blocks. Deduplication, which is the removal of redundancies from data before it is written to the flash media, is global (over the entire system), is always on, and is performed in real-time (never as a post-processing operation). After the deduplication performed in XIO, the data is compressed inline, before it is written to the SSDs. Thus, with XIO, inline data compression is the compression of the already deduplicated data before it is written to the flash media/solid state devices (SSDs). XIO, for example, automatically compresses data after all duplications have been removed. This ensures that the compression is performed only for unique data blocks. Data compression is performed in real-time and not as a post-processing operation. The nature of the data set determines the overall compressibility rate. The compressed data block is then stored on the array. Compression reduces the total amount of physical data that needs to be written on the SSD.

In certain embodiments, Quick Assist Technology (QAT) (available from Intel Corporation of Santa Clara, Calif.) provides a hardware based acceleration capable of improving performance of storage, networking, and data security applications across a data center. For example QAT provides support for inline data compression in real time, to help reduce the workload on other components in a replication system (like those of FIGS. 1 and 3, described further herein), to reduce need for post-processing compression, to help enable compression of replicated, mirrored, and/or remote data in addition to compression of primary storage volume, and to extend compression to virtualized storage systems.

In certain embodiments, Non-Volatile Memory Express (NVMe) protocol), also referred to as the Non-Volatile Memory Host Controller Interface Specification (NVM-HCI)), is a logical device interface specification for accessing non-volatile storage media attached via PCI Express (PCIe) bus.

FIG. 1 is a first simplified block diagram of a data protection system 100, in accordance with at least one illustrative embodiment of the instant disclosure. Referring to the illustrative embodiment shown in FIG. 1, exemplary data protection system 100 may include two sites, production site 102 (which in some embodiments can correspond to a source site) and replication site 122 (which in some embodiments can correspond to a target site). Production site 102 may generally be a facility where one or more hosts run data processing applications that write data to a storage system and read data from the storage system. Replication site 122 may generally be a facility where replicated production site data is stored. In such embodiments, replication site 122 may back up (e.g., replicate) production data at production site 102. Production site 102 has splitter 106, which splits I/O sent to LUN 112A, such as I/O 175, by making a copy of the I/O and sending it to DPA 108A. DPA 108A sends the I/O, such as I/O 175, to DPA 108B on replication site 122. DPA 108B on replication site 122 sends I/O 175 to LUN 112B on Replication site 122. In some embodiments, the DPA 108B manages a journal 176B of the data the replica site 122, as well as a full copy of the data.

Some embodiments of data protection system 100 may be provided as physical systems for systems for the replication of physical LUs, or as virtual systems for the replication of virtual LUs. In certain embodiments, production site 102 and replication site 122 may be remote from one another. For example, replication site 122 may be implemented as one or more "virtual" or "cloud" replication sites located remotely from production site 102 and in communication via a WAN or other network link (e.g., the Internet, etc.) (not shown). As will be appreciated, local data protection may have the advantage of minimizing data lag between target and source, and remote data protection may have the advantage of being robust in the event that a disaster occurs at the source site.

Referring again to FIG. 1, replication site 122 may replicate production site data and enable rollback of data of production site 102 to an earlier point in time (PIT). Rollback may be used in the event of data corruption of a disaster, or alternatively in order to view or to access data from an earlier point in time. In some embodiments, replication may be triggered manually (e.g., by a user) or automatically. In certain embodiments, the data protection system 100 may include a failover mode of operation, wherein the direction of replicated data flow is reversed (e.g., where production site 102 may behave as a target site and replication site 122 may behave as a source site.

As shown in FIG. 1, production site 102 may include a host or virtual machine (host/VM) 104, splitter 106, storage (or storage array) 110A, and a data protection appliance (DPA) 108A. A host computer may be one computer, or a plurality of computers, or a multiprocessor system, or a network of distributed computers. Each computer may include, among other things, a conventional CPU, volatile and non-volatile memory, a data bus, an I/O interface, a display interface, and a network interface. In some embodiments, a host computer runs at least one data processing application, such as a database application and an e-mail server. In some embodiments, host 104 may write to a logical unit in storage 110A. As will be understood the host/VM 104 may write to virtual disk (not shown) in a virtual machine file system (VMFS) (not shown). Replication site 122 may include DPA 108B and storage 110B. In some embodiments, host 104 may include one or more devices (or "nodes") that may be designated an "initiator," a "target", or both, coupled by communication links appropriate for data transfer, such as an InfiniBand (IB) link or Fibre Channel (FC) link, and/or a network, such as an Ethernet or Internet (e.g., TCP/IP) network that may employ, for example, the iSCSI protocol.

In addition, as will be appreciated additional hosts or virtual machines (not shown) maybe operably coupled to the cloud replication site 122 or production site 102 (or generated, in the case of virtual machines), as necessary or "on demand". This may be advantageous, for example, if an implementation utilizes multi-parallel processing (also known as massively parallel processing) to perform some or all of the functions described herein, to improve efficiency. In some embodiments, data from the production site 102 (i.e., "on premises) is sent directly to an object store in the cloud (not shown), and this data can be operated on in a multi-parallel way bringing up virtual machines to work on the objects periodically in the cloud (e.g., as needed).

Referring again to FIG. 1, storage 110A and storage 110B may include storage devices for storing data, such as disks or arrays of disks. Storage 110A may provide (e.g., expose) one or more logical units (LUs) 112A to which production commands are issued, while storage 110B may provide (e.g., expose) one or more logical units (LUs) 112B to which replication commands are issued.

Storage system 110A may expose a journal LU 176A for maintaining a history of write transactions made to LU 112A, referred to herein as a "journal." In some embodiments, a journal may be used to provide access to storage at specified points-in-time (PITs). In some embodiments, the journal may be stored across multiple LUs (e.g., using striping, etc.). In some embodiments, DPA 108 may include a journal processor 180A for managing the journal within journal LU 176A. In some embodiments, journal processor 180A may manage the journal entries of LU 112. Specifically, in some embodiments, journal processor 180A may enter write transactions received by DPA 108 from the replication site DPA 108B into the journal by writing them into journal LU 176A, read the undo information for the transaction from LU 112A, update the journal entries in journal LU 176A with undo information, apply the journal transactions to LU 112A, and remove already-applied transactions from the journal.

In some embodiments, a snapshot replica may be a differential representation of a volume. For example, the snapshot may include pointers to the original volume, and may point to log volumes for locations of the original volume that store data changed by one or more I/O requests. In some embodiments, snapshots may be combined into a snapshot array, which may represent different images over a time period (e.g., for multiple PITs).

In some embodiments, DPA s 108A, 108B may perform various data protection services, such as data replication of storage system 100, and journaling of I/O requests issued by device 104. DPAs 108A, 108B may also enable rollback of production data in storage 110A to an earlier point-in-time (PIT) from replica data stored in storage 110B, and enable processing of rolled back data at the target site. In some embodiments, rollback may be used in the event of data corruption of a disaster, or alternatively in order to view or to access data from an earlier point in time. In some embodiments, each DPA 108A, 108B may be a physical device, a virtual device, or may be a combination of a virtual and physical device.

In the architecture illustrated in FIG. 1, DPAs 108A, 108B are standalone devices integrated within a SAN. Alternatively, each of DPA 108A, 108B may be integrated into storage system 110A and storage system 110B, respectively, or integrated into host computer 104 (as well as any other component or computer at replication site 122). Both DPAs communicate with their respective host computers through communication lines such as fiber channels using, for example, SCSI commands, or any other protocol. In at least some embodiments, the replica site only has object storage.

In some embodiments, DPA 108A may receive commands (e.g., SCSI commands) issued by device 104 to LUs 112. For example, splitter 106 may intercept commands from device 104, and provide the commands to storage 110A and also to DPA 108A. In some embodiments, the splitter 106 may intercept data operations at several logical levels. In some embodiments, the splitter helps in replication of block level devices and intercepts I/O at the SCSI layer. In some embodiments, splitter 106 may act on intercepted SCSI commands issued to a logical unit in one of the following ways: send the SCSI commands to its intended LU; redirect the SCSI command to another LU; split the SCSI command by sending it first to DPA 108A and, after DPA 108A returns an acknowledgement, send the SCSI command to its intended LU; fail a SCSI command by returning an error return code; and delay a SCSI command by not returning an acknowledgement to the respective host. In some embodiments, splitter 106 may handle different SCSI commands, differently, according to the type of the command. For example, in some embodiments, a SCSI command inquiring about the size of a certain LU may be sent directly to that LU, whereas a SCSI write command may be split and sent to DPA 108A.

In certain embodiments, splitter 106 and DPA 108B may be drivers located in respective host devices of production site 102 and replication site 122. Alternatively, in some embodiments, a protection agent may be located in a fiber channel switch, or in any other device situated in a data path between host/VM 104 and storage 110A. In a virtualized environment, the protection agent may run at the hypervisor layer or in a virtual machine providing a virtualization layer. For example, in such embodiments, a hypervisor may consume LUs and may generate a distributed file system on the logical units such as Virtual Machine File System (VMFS) that may generate files in the file system and expose the files as LUs to the virtual machines (each virtual machine disk is seen as a SCSI device by virtual hosts). In another embodiment, a hypervisor may consume a network based file system and expose files in the Network File System (NFS) as SCSI devices to virtual hosts. It will be appreciated that use of SCSI format is not mandatory, and a hypervisor may consume files as disks with other protocols, such as SATA or proprietary protocols.

In some embodiments, production DPA 108A may send its write transactions to replication DPA 108B using a variety of modes of transmission, such as continuous replication or snapshot replication. For example, in continuous replication, production DPA 108A may send each write transaction to storage 110A and also send each write transaction to replication DPA 108B to be replicated on storage 110B. In snapshot replication, production DPA 108A may receive several I/O requests and combine them into an aggregate "snapshot" or "batch" of write activity performed to storage 110A in the multiple I/O requests, and may send the snapshot to replication DPA 108B for journaling and incorporation in target storage system 120. In such embodiments, a snapshot replica may be a differential representation of a volume. For example, the snapshot may include pointers to the original volume, and may point to log volumes for locations of the original volume that store data changed by one or more I/O requests. In some embodiments, snapshots may be combined into a snapshot array, which may represent different images over a time period (e.g., for multiple PITs).

FIG. 2 is a diagram illustrating a journal history of write transactions for the data protection systems of FIGS. 1A-1B, in accordance with at least one illustrative embodiment of the instant disclosure. Referring to FIG. 2, in some described embodiments, a write transaction 200 may be included within a journal and stored within a journal LU. In some embodiments, write transaction 200 may include one or more identifiers and a time stamp indicating the date and time at which the transaction was received by the source DPA. In some embodiments, write transaction 200 also includes a write size indicating the size of the data block; a location in the journal LU where the data is entered; a location in the target LU where the data is to be written; and the data itself.

Referring to FIGS. 1-2, in some embodiments, transaction 200 may correspond to a transaction transmitted from production DPA 108A to replication DPA 108B. In some embodiments, production DPA 108A may record write transaction 200 in the journal that includes four streams. In some embodiments, a first stream, referred to as a "DO" stream, includes a copy of the new data for writing to LU 112. In some embodiments, a second stream, referred to as a "DO METADATA" stream, includes metadata for the write transaction, such as an identifier, a date and time, a write size, the offset within LU 112A where the new data is written, and a pointer to the offset in the DO stream where the corresponding data is located. In some embodiments, a third stream, referred to as an "UNDO" stream, includes a copy of the data being overwritten within LU 112A (referred to herein as the "old" data). In some embodiments, a fourth stream, referred to as an "UNDO METADATA" stream, includes an identifier, a date and time, a write size, a beginning address in LU 112A where data was (or will be) overwritten, and a pointer to the offset in the UNDO stream where the corresponding old data is located.

In some embodiments, since the journal contains the "undo" information necessary to rollback storage system 100, data that was stored in specific memory locations at a specified point in time may be obtained by undoing write transactions that occurred subsequent to such point in time (PIT). In some embodiments, each of the four streams may hold a plurality of write transaction data. In some embodiments, as write transactions are received dynamically by the target DPA, the write transactions may be recorded at the end of the DO stream and the end of the DO METADATA stream, prior to committing the transaction. In some embodiments, a metadata stream (e.g., UNDO METADATA stream or the DO METADATA stream) and the corresponding data stream (e.g., UNDO stream or DO stream) may be kept in a single stream by interleaving metadata and data.

Having described an exemplary data protection system and journal history configuration in which at least some embodiments may be embodied, further details of at least some embodiments related to optimized data replication (DR) using a special NVMe protocol and running in friendly zone of storage arrays, will now be described. Although the following disclosure and certain example embodiments are described in connection with their use with data centers, DPAs, RPAs, hosts, SANs, LUNs, etc., it will be appreciated that the disclosures and embodiments herein are not limited to these applications, but can find applicability in virtually any type of computer system. In at least some aspects, embodiments are described herein create journal based replications to an object store target, including methods for doing a rebuild of point in time copies using a multi-parallel process with map reduce.

Products like RECOVERPOINT (also available from DELL/EMC of Hopkinton Mass.) can replicate XIO volumes using a snapshot shipping method. The RECOVERPOINT system creates a snapshot of a volume, then asks for the difference information associated with a previous version of the same volume, then reads the differences and ships the information about the differences to a replica site. In this arrangement, all the protocol work is done using a SCSI protocol, and the RECOVERPOINT system needs to decompress the data from the production side storage array (where such data, in an XIO array, is stored in compressed form) and then recompress it, which can lead to inefficiencies. In some embodiments, an API is used to read metadata of the differences, resulting in a metadata key relating to where information was last read, wherein the next read after that reads the next set of metadata.

Generally, for any replication, when replication is done to an array, there are latencies added and overhead incurred by the fact that replication is being provided. For example, some types of replication can result in one write from a production site ending up in 5 or more writes at the replication end (e.g., to journals, metadata, etc.). Often, when replication is done over great distances, processes such compression and deduplication are implemented to reduce the size of the data that needs to be transmitted, but these processes also can add to inefficiency. For example, there can be slowness resulting from data access latency, slow throughput, and system resource consumption when entities along the path from a production site to replication site have to compress and decompress data, especially where can be delays in getting the data from storage. Another issue is that, in some implementations, the replication engine itself (e.g., the DPA) performs the compressing and uncompressing, which means it can slow down the replication process, because resources are being used for compression instead of for transmitting data to a replication site.

Given these challenges, it is advantageous if replication systems can implement arrangements to improve speed and access to data during the replication, including by implementing techniques such as in-line, real time compression, and decompression, in a manner that does not burden components like the DPA. Efforts have been made to improve this in other embodiments. For example, in some implementations, arrangements have been tried to give the DPA better access to the storage, but this can leads to inefficiencies, of needing to decompress and recompress the data, as well as the fact that it is impossible to expose significant amount of devices to a single VM. Making a DPA implement the compression and decompression, when the DPA is configured similar to DPA 108A of FIG. 1, can consume a lot of central processor unit (CPU) bandwidth, as well.

In some embodiments, arrangements are provided that use and adapt the built-in, internal compression mechanism of XIO, along with using and adapting of QAT, in combination with other features and aspects described herein, to allow the DPA to offload most of the data-processing needs in the replica side to XIO. By doing this, in some embodiments, the DPA can free-up most of its resources for other tasks and reduce its overall resource consumption. Also, the DPA is, in some embodiments, able to perform data-operations much faster than is possible without doing this offloading. For example, in some embodiments, decompressing data also is a CPU-intensive process. In some embodiments, decompressing also can be offloaded to specialized hardware, where QAT allows these operations to be done on the hardware, without having to rely on software implementation of compression. In some embodiments, when using QAT, the software can apply the data to memory accessed by QAT and let QAT perform the "heavy-lifting" operations of data compression and (de)compression. Embedding the DPA in the array "friendly zone," (described further herein) in some embodiments, allows the DPA to have extremely fast access to the data that the array maintains, and allows the DAP also to optimize its data access in ways not possible before.

Thus, in some embodiments, arrangements, systems, and methods are provided that can improve the efficiency of at least some aspects of the replication process. For example, FIG. 3 is a second simplified block diagram of a data protection system, in accordance with at least one illustrative embodiment of the instant disclosure, which provides at least some of the above-described improvements.

Referring to FIG. 3, the optimized data protection system 300 includes some elements that are similar to those in the data protection system 100 of FIG. 1 in many ways, so in the interest of brevity, details of their operation are not repeated. One difference in some embodiments, however, is that the storage arrays 310 of FIG. 3 differ from the storage arrays 110A of FIG. 1, because the storage arrays 310 of FIG. 3, in at least some embodiments, include these features, which are all further described herein:

- built in, in-line deduplication and compression features (for embodiments that are configured using XIO arrays as the array 310)
- a "friendly zone" 311 in which privileged applications are permitted to run on the storage array;
- a DPA 308 configured to run in the friendly zone (described further below); and
- an intermediary device 313 configured to serve as a middle point in communications between the LU 312 and DPA 308 and to provide additional compression and decompression features The optimized data protection system 300 includes a production site 302 and replication site 322, which are functionally similar to the production site 102 and replication site 122 of FIG. 1, especially regarding the Host/VM 304 (which is functionally similar to the Host/VM 104); the splitter 306 (which is functionally similar to the splitter 106 of FIG. 1). However, the splitter 306 of FIG. 3 differs from the splitter of FIG. 1 in terms of what devices communicate with it. For example, in some embodiments, instead of splitting I/O between the LU 312 and making a copy to be sent to DPA 308A (where, in embodiments like that of FIG. 1, the DPA 108 of FIG. 1 would implement compression and/or decompression), the splitter 306 splits I/O 175 sent to LUN 312 between the LU 312 and the intermediary device 313A, where the intermediary device 313A receives a copy, where the communication occurs within the array 310A, in some embodiments, at least partially via NVMe.

Because, in some embodiments, this is an XIO type of storage array 310, data received into the storage array 310A is automatically reduced (first by deduplication, then by compression), as shown in FIG. 3 as "in-line dedup+compression" 319A (and also 319B, at replication side, the in-line dedup+compression is activated for I/O's going through the regular path from hosts, such as host/VM 304', but generally is not needed for replication traffic handled by the DPAs 308, because the data going from DPA 308A to DPA 308B is already compressed). In some embodiments, compressed data 179 coming into the Logical Unit 312A, even though already compressed, is not optimally compressed. For example, in some devices, such as XIO, compression is performed on data coming in with first predetermined boundaries associated with the arrays, for example, in some embodiments, boundaries of 8K of data. Although this may be efficient for XIO internal purposes, this might not provide the most advantageous compression ratio as compared to compressing larger amounts of data (e.g., 1 MB). Thus, in some embodiments, the intermediary device 313B converts the compressed data 179 that it receives (having first set of boundaries) into a more compressible format (e.g., 64K boundaries or any other predetermined compression standard), decompresses (e.g., using decompression engine 317B), then recompresses into a more compressible format (e.g., the 64K boundaries or 1 MB boundaries, or any second predetermined size of boundary) (e.g., using compression engine 315B). The intermediary device 313A is responsible for uncompressing the data having the first predetermined boundaries and recompressing it with the second predetermined boundaries. At the replication site 322, the reverse is occurring. Data compressed with, for example, a second predetermined boundary (e.g., 1 MB) is arriving (e.g., compressed data 179 between DPA 308B and intermediary device 313B) and the intermediary device 313B recompresses it into a third predetermined boundary appropriate for or required by the array, e.g., 8 KB boundary. The starting boundary at the production site need not be the same as the ending boundary at the replication site.

In certain embodiments, the intermediary device 313 is a virtual type of device, where the intermediary device 313 effectively presents a view of the data sitting in 312A to the consumer using the data (e.g., the DPA). Therefore, in certain embodiments pre-compressed data 179 only flows to 312A, and not to 313A. In certain other embodiments, however, data actually is sent to intermediary device 313A (as shown via the dotted line labeled "pre-compressed data 179 (optional)" in FIG. 3). In these embodiments where the data optionally is sent to intermediary device 313A, the intermediary device 313 is configured to perform re-compression in a proactive manner to serve as a cache to help speed retrieval even further once the DPA 308 request the data. For example, a request of data from the DPA 308 can be expected in some embodiments, because new data needs to be replicated.

In some embodiments, QAT is used in conjunction with the decompression 317B and/or (optional) compression 315B features. Use of QAT can be advantageous because QAT can be provided at the chip level, thus providing a hardware-based compression and/or decompression solution, which can be faster and more efficient. It will be appreciated, however, that use of QAT is merely illustrative, and that other hardware based compression and/or decompression features also are usable in at least some embodiments.

In some embodiments, the intermediary device 313 functions at least in part as buffer that serves as an intermediate end point for data moving between the LU(s) 312A, 312B and the DPAs 308A, 308B. That is, the intermediary device 313, in some embodiments, provides at least one array endpoint where a DPA 308 can send I/O's to it, send reads and writes to it, etc. In at least some embodiments, a useful purpose for the intermediary device 313 is to ensure that I/O sent to or through the intermediary device 313 is properly compressed, decompressed, etc., as noted above. In some embodiments, the intermediary device 313 behaves more like a layer that translates, compresses, and decompresses data. The intermediary device 313A on the production side 302 reduces the size of the data it receives (e.g., by compression and/or deduplication), before providing it to the DPA 308A, as described further herein, where the data is provided as re-compressed data 181, for eventual transmission to the replica site 322. That is, when the production site 302 is to write data to the replication site 322, that the production site 302 receives from Host/VM 304, the data, once provided to the XIO array 310A, is deduplicated and compressed by the XIO storage array 310A itself, when it is arriving at the array 310A, as shown in FIG. 3. Note that, although the in-line dedup+compression 319A is shown as overlaying the inputs into the friendly zone 311A, that is merely for purposes of illustration and not limitation—the in-line dedup+compression 319A need not be configured to be part of the friendly zone 311A.

At the replication site 322, the intermediary device 313B accepts writes in compressed format (e.g., the compressed data 179), which in some embodiments, when received into the XIO storage array 310B, are automatically deduplicated and compressed. The intermediary device 313B then performs decompression, e.g., using internal QAT functionality built into the decompression engine 317B on the XIO hardware. Once the data is uncompressed, it will be moved internally to the target device LU 312B, and written there. In some embodiments, the intermediary device 313B decompresses the received compressed data 179, which is received with a first type of boundary (e.g., 1 MB boundary) and recompresses it to a second type of boundary (e.g., 8K boundary). In some embodiments, the intermediary device 313B (which is shown in FIG. 3 as including both decompression 317B and optional compression 315B) includes only decompression 317B and uses the standard array "in line" compression/deduplication engine 319B to perform the recompression. Thus, the functionality of compression 315B of the intermediary device 313B is achieved, in some embodiments, using built in in-line compression in the array.

As FIG. 3 illustrates, the storage array 310 is, in some embodiments, a flash array, such as an XIO array 310. In some embodiments, the array 310 includes a "friendly zone" 311A, which is a predetermined privileged zone where services and processes can execute in a safe manner while having direct access to data stored on the array 310 (e.g., in storage devices), using high-speed, low-latency protocols such as remote direct memory access (RDMA) and/or NVMe. In some embodiments, this friendly zone 311A is configured to run one or more privileged processes or applications, so that the privileged processes or applications are able and/or permitted to have more direct access to the internal mechanics and other aspects of the storage array 310 and its LU(s) 312, as compared to non-privileged applications that are not running in this friendly zone 311A.

For example, in some embodiments, the friendly zone 311A runs a DPA process 308A. DPA 308A of FIG. 3 (which in certain embodiments is a RECOVERPOINT appliance (RPA), is a component that helps take care of replication, runs directly on the storage array 310, within the friendly zone 311A, to provide a very fast way of accessing and working with data stored in the LU 312 of the array 310 (including but not limited to replication of that data, compression of that data, and decompression of that data). Generally, the host/VM 304 will not have the same level of access to the LU 312 of the array 310 as do services and other entities running in the friendly zone 311A. In some embodiments, the XIO array 310 effectively serves as a hypervisor and the DPA 308A serves as a virtual machine running an operating system (OS) on the DPA 308A. Within the DPA 308A, in some embodiments, is an NVMe driver 309A. The NVMe driver 309A helps the RPA 309A to get fast access to the storage. In some embodiments, the NVMe driver 309A understands and uses the NVMe protocol, as discussed herein, serving reads/writes by the DPA 308 through a high-performance, low-latency NVMe mechanism. For example, in one embodiment, the NVMe driver provides a "cut-through" functionality that allows a virtual machine (such as the DPA) direct access to underlying storage devices (in this case, the storage's storage drives), instead of going through the various virtualization layers that are implemented by any hypervisor. This is usually referred to as "para-virtualization" and is usually done to allow guest OS's take advantage of special hardware capabilities and to reduce latencies and overheads that are incurred by the virtualization stack. For example, in some embodiment, the NVMe driver 309A provides the para-virtualized access by the DPAs 308 (which, in some embodiments, correspond to virtual machines on a hypervisor of the storage array 310) directly to internal back-end devices in the array (specifically, in some embodiments, in the intermediary devices 313).

In some embodiments, by providing a VM representation of the DPA 308A in the friendly zone 311A of the array 310A and effectively offloading the compression and/or decompression functions to a process running on the array 310A itself (i.e., both on the intermediary device 313A, as described herein and, in some embodiments, as part of the in-line compression of the XIO storage array 310A), it frees the DPA 308A to be able to replicate more data, more efficiently. In addition, this arrangement generally can result in faster compression and/or decompression, because the array 310A has faster access to the data in the LU 312A than does the a conventionally arranged DPA, such as the DPA 108 of FIG. 1.

Referring again to FIG. 3, similar to the DPA 108A of FIG. 1, in some embodiments, the DPA 308A manages a journal LU 376A of the data of the production site. In addition, as with the system 100 of FIG. 1, the data protection system 300 of FIG. 3 can, of course, be provided as either a physical or virtual system, for replication of physical or virtual LUs, respectively.

In some embodiments, at the production site 302, the XIO storage array 310A exposes an intermediary device 313A to the DPA 308A (which runs in the XIO array itself, as mentioned), where the intermediary device 313A is bound to a target device (e.g., the LU 312A) that exists in the XIO array 310A. In some embodiments, when an intermediary device 313A is bound to a target device like LU 312A, it means that writes to the LU are first written instead to the intermediary device, so that the intermediary device can perform some action on the information that is written first (e.g., compression or decompression) before the data is later provided to the target device. In some embodiments, this allows the intermediary device 313A to act as a buffer, so that writes and reads can proceed more quickly, while the more time consuming processes of compression and/or decompression can happen in the background or a the same time. For example, in some embodiments, the intermediary device 313A accepts writes in compressed format, and will perform decompression using internal QAT functionality on the XIO hardware of storage array 310A. Once the data is uncompressed, it will be moved internally to the target device LU 312A, and written there.

In some embodiments, the XIO storage array 310A actually generates the intermediary device 313A, to exist alongside the LU 312A. The intermediary device 313A, as noted above, is able to accept writes into it in both a compressed and uncompressed format. Thus, referring to FIG. 3, the intermediary device 313A is able to receive I/O writes 175' of uncompressed or compressed data from splitter 306, is able to receive compressed data 179 from the LU 312A and to later convert it to uncompressed data, to respond to a READ request form Host/VM 304, is able to provide compressed data 179 to the DPA 308A (e.g., for transmission to the replication site 322), and it is able to further compress already compressed data 179 (e.g., data that has been "pre-compressed" by the XIO array 310A itself) that it receives for writing into the LU 312A. For example, if there's a LUN 312A that is storing data on XIO storage array 310A, the intermediary device 313A can be created in association with LU 312A, where, in some embodiments, the intermediary device 313A corresponds to a virtual device exposed to the DPA, for example through the NVMe driver, where the intermediary device 313A serves as an endpoint that can receive I/O requests and process them based on the data that lives in the back-end device to which it is bound (in this example, 312A).

Referring again to FIG. 3, similar components are present on the replication site 322 and similar optimizations are possible. The XIO storage array 330B on the replication site also has its own friendly zone 311B, in which the DPA 308B is configured, where, in some embodiments, DPA 308B receives data sent from DPA 308A and handles the processes needed to apply it to the storage at replication site 322. The DPA 308B receives compressed data 179, sent to it from the production site 302, and provides it as compressed data 179 to the intermediary device 313B. In some embodiments, Note that the recompressed data 181 data sent from production site 302 to replication site 322 may actually represent multiple writes aggregated together or some other proprietary protocol employed by the DPAs 308, where in those embodiments, the I/O's cannot be sent directly to 313B, but must pass through the DPA 308B. The intermediary device 313B, uses its built in decompression engine 317B and compression engine 315B to convert the received compressed data 177 to decompressed data and then recompressed into compressed data to provide to LU(s) 312B.

In some embodiments, the XIO array 310 is configured with a hypervisor (not shown in FIG. 3) which can access the LU 312 of the XIO array 310 using NVMe protocol, leading to low latency and high throughput. Note that any entities running within the friendly zone 311 are, effectively, running on top of the hypervisor. In some embodiments it is possible to expose devices (e.g., the LU(s) 312, the Journal LU 376) to the DPA 308A implemented within the "friendly zone" as noted above, and further to leverage a guest OS NVMe driver 309 running inside the virtualized DPA 308A to get a fast access to the storage itself (e.g., the disk arrays 312, 376 in the XIO array). As noted herein, in some embodiments, the driver provides para-virtualized access to the underlying devices.

FIG. 4 is a flowchart 400 of actions occurring at the production side 302 in the data protection system of FIG. 3 during a READ operation, in accordance with at least one illustrative embodiment of the instant disclosure. These actions can occur, for example, when the DPA 308A is going to read information from its own storage array. In block 405, the intermediary control device 313A is exposed to the DPA 308A using NVMe (the intermediary device 313A, in some embodiments, is exposed only to the DPA 308A (or, in some embodiments, in other entities running within the array's "friendly zone" 311A) and is not directly accessible to a host/VM 304). A READ command from host/VM 304 is received at the DPA 308A (generally does not go through splitter 306), where the READ command passes through the DPA 308A on its way (ultimately) to the intermediary device 313A. In some embodiments, the READ functionality the intermediary device 313A provides is serving the DPA 308A internally. The READ request is then Parsed (block 415) for information relating to the data being read currently and the next chunk of data to be read. For example, in some embodiments, the READ command is configured such that it includes an offset that serves as a key to the next chunk of data that is to be read. In some embodiments, the READ command also may include the volume ID of the LU 312A that is currently being read, as well as a key describing the current chunk of data we being read. In some embodiments, the READ command also sets an amount of data that the sender of the read command is looking to read (e.g., 1 MB).

In the background of receiving the read command, the XIO storage array 310A will, based on the parsed instructions in block 415, read compressed data from the LU 312A in the background into the intermediary device 313A (block 413) and, in some embodiments, uses Intel-QAT (QuickAssist Technology) to decompress the data (block 420) before providing it to the DPA 308A (block 425) as part of the READ response. Note that, because the intermediary device 313A is reading compressed data from the LU 312A, the read operation will be significantly faster than reading data stored in uncompressed form, because the read inherently will involve reading less information (in some embodiments, up to 10 times less data). In some embodiments, the READ response sent to the DPA 308A also includes metadata. Decompressing the data from the LU 312A (to respond to a READ request) can be a CPU-intensive process, but, in the arrangement of FIG. 3, decompressing is offloaded to specialized technology (e.g., the decompression engine 317A of the intermediary device 313A, which decompression engine may be implemented, in some embodiments, to use QAT, as discussed herein). In addition, because everything up to the point of sending the READ response back to the DPA 308A, is being done within the storage array 310A itself, not only is CPU usage reduced, but latency is reduced/improved.

After the decompressed data is sent to the requesting entity (block 435), the process continues (block 440), moving towards the next chunk to be read and repeating blocks 413-435, until no more data chunks need to be read.

FIG. 5 is a simplified flowchart 500 of actions occurring at a replication side in the data protection system of FIG. 3, during a WRITE operation, in accordance with at least one illustrative embodiment of the instant disclosure. This flowchart 500 shows an example, applicable to some embodiments, where data is written to the production side and, substantially simultaneously, a copy is written to the replication site 322.

The intermediary device 313A is exposed over NVMe (block 505) and receives and parses a WRITE request from the Host/VM 304 (block 510). The WRITE request includes uncompressed data 177, and is provided through the splitter 306, where it transmits the data to be written to both the LU 312A and to the intermediary device 313A (for writing to the replication side 322). The data included with the WRITE request is, in some embodiments, deduplicated and compressed by the built-in functionality of the XIO array 310A (block 515) before it is provided to the intermediary site (block 525) and before it is written to the LU 312A (block 520).

In some embodiments, intermediary device 313B at the replica site accepts writes in compressed formats, and performs decompression (e.g., using the internal decompression engine 317B provided by the QAT functionality on the XIO hardware of the XIO storage array 310B. Once the data is decompressed, it is moved internally to the target LU 312B and written there. In the WRITE command, the offset on the intermediary device 313B where the compressed I/O from the RPA 308B will be written is, in some embodiments, the actual offset where the write is expected to be performed on the LU 312B. The size of the WRITE is, of course, dependent on the actual compression ratio. For example, in some embodiments, on a 10:1 compression ratio, the write to the intermediary device 313B will be 10 times smaller than the actual write to the LU 313B. Because, in some embodiments, decompression is done using QAT functionality, and the data movement is done internally in XIO, the WRITE process can be very fast and efficient: the RPA 308A/308B does not need to spend CPU cycles on compression or decompression, and the data bandwidth written from the RPA to XIO is much smaller than the actual data that will be applied (due to it being compressed). In general, all the RPA 308B needs to do is get an I/O replicated to it, and immediately apply it to the intermediary device 313B in the original offset written in the I/O's metadata.

Referring again to FIG. 5, at the intermediary site 313A, the received WRITE data, which has been "pre compressed"

and reduced by the in-line deduplication and compression 319A, is then decompressed and re-compressed (block 527) using a more compressible format (e.g., using QAT as described above). The recompressed data 181 is provided to the production side DPA 308A (block 529) and transmitted (block 530) to the DPA 308B at replication site 322 (block 535). In some embodiments, including those implemented using an XIO array as the storage array 310B, the received data in the WRITE request is further deduplicated and compressed (block 540) when it is received into the storage array 310B. The compressed data 179 arrives at the intermediary device 313B (block 545), where, in some embodiments, it is decompressed (block 550) and recompressed to a more compressible format (block 555), before the information is written to the replica side LU 312B (block 560).

FIG. 6 is as simplified flowchart of as basic method of operation of the system of FIG. 3, in accordance with at least one illustrative embodiment. Referring to FIGS. 3 and 6, in block 705, a first storage array 310A is configured to be in operable communication with a host/VM 304. In block 710, a privileged zone (which can be a predetermined privileged zone) on the storage array is defined (block 710) (also referred to herein as a "friendly zone"311A), where in some embodiments the privileged zone is configured to permit at least one predetermined process to have direct access to an LU configured as part of the storage array. In block 715, a DPA 308A is configured to operate within the privileged zone 311A. In block 730, an intermediary device 313A is defined on the storage array 310A, the intermediary device being in operable communication with the host and LU. The intermediary device, in some embodiments, is in operable communication with the host and DPA 308, where the intermediary device is configured to receive read and write instructions from the host and to ensure that I/O's passing through the DPA 308A to the intermediary device 313A, to at least one of the LU and DPA, are formatted to a first predetermined standard. In some embodiments, the method of FIG. 6 further includes an optional block 735 wherein a check is made to ensure that I/O's passing through the intermediary device 313A are appropriately compressed or decompressed, as applicable.

In the above-described flow charts of FIGS. 4-6, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

In some described embodiments, the host/VM (e.g., host 104 of FIG. 1 and 304 of FIG. 3) may each correspond to one computer, a plurality of computers, or a network of distributed computers. For example, in some embodiments, host 104, and/or host 116 may be implemented as one or more computers such as shown in FIG. 7. As shown in FIG. 7, computer 800 may include processor 802, volatile memory 804 (e.g., RAM), non-volatile memory 806 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804 to perform at least a portion of the processes shown in FIGS. 4-5. Program code may be applied to data entered using an input device of GUI 808 or received from I/O device 820.

The processes of FIGS. 4-5 are not limited to use with the hardware and software of FIGS. 1-3 or FIG. 7-7 and may find applicability in any computing or processing environment and with any type of machine or set of machines that may be capable of running a computer program. The processes described herein may be implemented in hardware, software, or a combination of the two. The logic for carrying out the method may be embodied as part of the system described in FIG. 7, which is useful for carrying out a method described with reference to embodiments shown in, for example, FIGS. 1-5. The processes described herein are not limited to the specific embodiments described. For example, the processes of FIGS. 4-5 are not limited to the specific processing order shown in FIGS. 4-5. Rather, any of the blocks of the processes may be re-ordered, combined, or removed, performed in parallel or in serial, as necessary, to achieve the results set forth herein.

Processor 802 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 7, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 8 shows Program Logic 910 embodied on a computer-readable medium 930 as shown, and wherein the Logic is encoded in computer-executable code configured for carrying out the reservation service process of this invention and thereby forming a Computer Program Product 900. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A first storage system, comprising:
   a host;
   a storage array in operable communication with and responsive to instructions from the host, the storage array comprising:
   a logical unit (LU) configured for storing data;
   a privileged zone configured within the storage array, the privileged zone permitting at least one or more predetermined processes running in the privileged zone to have a first level of access to the data on the LU that is more direct than a second level of access granted to processes not running in the privileged zone;
   a data protection appliance (DPA) configured to operate within the privileged zone, and
   an intermediary device in operable communication with the host, LU and the DPA, wherein the intermediary device is configured so that at least a portion of I/O's to or from the LU are done via the intermediary device, wherein the intermediary device is configured to provide the first level of access, and wherein the intermediary device is further configured to:
      receive read and write instructions from at least one of the host and the DPA; and
      ensure that inputs and outputs (I/O's) passing through the intermediary device to at least one of the LU and the DPA, in response to the reads and writes, are compressed in accordance with an optimized predetermined compression standard that is optimized for requirements of the at least one of the LU and the DPA.

2. The first storage system of claim 1, wherein the intermediary device is further configured to:
   ensure that I/O's to the LU are compressed to a first predetermined compression standard usable with and having a boundary size optimized for the LU, if the LU requires compressed information; and
   ensure that I/O's to the LU are decompressed if the LU requires decompressed information.

3. The first storage system of claim 1, wherein the intermediary device is further configured to ensure that I/O's to the DPA are compressed to satisfy a second predetermined compression standard usable with and having a boundary size optimized for the DPA.

4. The first storage system of claim 1, wherein the intermediary device is further configured to:
   receive a first I/O compressed in accordance with an initial predetermined compression standard, the initial predetermined compression standard being different than the optimized compression standard;
   decompress the first I/O; and
   re-compress the first I/O to the optimized predetermined compression standard.

5. The first storage system of claim 1, wherein the intermediary device is configured in a relationship with the LU, wherein writes of data to the LU are first written instead to the intermediary device.

6. The first storage device of claim 5, wherein the intermediary device is configured so that, after writes of data are first written to the intermediary device, the intermediary device converts the written data to at least one of compressed and uncompressed format, as required by the LU.

7. The first storage system of claim 1, wherein the storage array comprises an array having an in-line compression feature and wherein the intermediary device is configured to operate using the in-line compression of the storage array.

8. The first storage system of claim 1, wherein the DPA is configured to interact with a second storage system in operable communication with the first storage system.

9. The first storage system of claim 1, wherein the first level of access for the privileged zone is configured to provide the at least one or more predetermined processes direct access to data stored in the LU in accordance with least one of a high-speed low-latency protocol, a remote direct memory access (RDMA) protocol, a Non-Volatile Memory Express (NVMe) protocol, and a Non-Volatile Memory Host Controller Interface Specification (NVMHCI).

10. A computer-implemented method, comprising:
configuring a first storage array in operable communication with a host;
defining on the storage array a privileged zone permitting at least one or more predetermined processes running in the privileged zone to have a first level of access to a logical unit (LU) configured for storing data as part of the storage array, wherein the first level of access is a more direct level of access to the data on the LU than a second level of access granted to processes not running in the privileged zone;
configuring a data protection appliance (DPA) to operate within the privileged zone;
defining on the storage array an intermediary device in operable communication with the host, DPA, and the LU, wherein the intermediary device is configured to provide the first level of access, and wherein the intermediary device is further configured to:
receive read and write instructions from at least one of the host and the DPA; and
ensure that inputs and outputs (I/O's) passing through the intermediary device to at least one of the LU and the DPA, in response to the reads and writes, are compressed in accordance with an optimized predetermined compression standard that is optimized for requirements of at least one of the LU and the DPA.

11. The computer-implemented method of claim 10, further comprising:
ensuring that I/O's to the LU are compressed to a first predetermined compression standard usable with and having a boundary size optimized for the LU, if the LU requires compressed information; and
ensuring that I/O's to the LU are decompressed if the LU requires decompressed information.

12. The computer-implemented method of claim 10, further comprising:
configuring the intermediate device to ensure that I/O's to the DPA are compressed to satisfy a second predetermined compression standard usable with and having a boundary size optimized for the DPA.

13. The computer-implemented method of claim 10, further comprising:
receiving a first I/O compressed in accordance with an initial predetermined compression standard, the initial predetermined compression standard being different than the optimized compression standard;
decompressing the first I/O; and
re-compressing the first I/O to the optimized predetermined compression standard.

14. The computer-implemented method of claim 10, wherein the intermediary device is configured in a relationship with the LU, wherein writes of data to the LU are first written instead to the intermediary device.

15. The computer-implemented method of claim 14, further comprising:
converting, after writes of data are first written to the intermediary device, the written data to at least one of compressed and uncompressed format, as required by the LU.

16. The computer-implemented method of claim 10, wherein the storage array comprises an array having an in-line compression feature and wherein the intermediary device is configured to operate using the in-line compression of the storage array.

17. The computer-implemented method of claim 10, wherein the DPA is configured to interact with a second storage system in operable communication with the first storage system.

18. The computer implemented method of claim 10, wherein the first level of access for the privileged zone is configured to provide the at least one or more predetermined processes direct access to data stored in the LU in accordance with least one of a high-speed low-latency protocol, a remote direct memory access (RDMA) protocol, a Non-Volatile Memory Express (NVMe) protocol, and a Non-Volatile Memory Host Controller Interface Specification (NVMHCI).

19. A computer program product including a non-transitory computer readable storage medium having computer program code encoded thereon that when executed on a processor of a computer causes the computer to operate a storage system, the computer program product comprising:
computer program code for configuring a first storage array in operable communication with a host;
computer program code for defining on the storage array a privileged zone permitting at least one or more predetermined processes running in the privileged zone to have a first level of access to the data on the logical unit (LU) that is more direct than a second level of access granted to processes not running in the privileged zone;
and configured for storing data as part of the storage array, wherein the first level of access is a more direct level of access to the data than a second level of access granted to processes not running in the privileged zone;
computer program code for configuring a data protection appliance (DPA) to operate within the privileged zone;
computer program code for defining on the storage array an intermediary device in operable communication with the host, DPA, and the LU, wherein the intermediary device is configured so that at least a portion of I/O to or from the LU are done via the intermediary device, wherein the intermediary device is configured to:
receive read and write instructions from at least one of the host and the DPA; and
ensure that inputs and outputs (I/O's) passing through the intermediary device to at least one of the LU and the DPA, in response to the reads and writes, are compressed in accordance with an optimized predetermined compression standard that is optimized for requirements of at least one of the LU and the DPA.

20. The computer program product of claim 19, further comprising:

computer program code for configuring the intermediary device to be in a relationship with the LU, wherein writes of data to the LU are first written instead of to the intermediary device; and computer program code for converting, after writes of data are first written to the intermediary device, the written data to at least one of compressed and uncompressed format, as required by the LU.

\* \* \* \* \*